United States Patent [19]
Nakai

[11] Patent Number: 5,978,096
[45] Date of Patent: Nov. 2, 1999

[54] FACSIMILE DEVICE AND METHOD FOR TRANSMITTING INFORMATION USING THE SAME

[75] Inventor: Hideki Nakai, Yamatokoriyama, Japan

[73] Assignee: Sharp Kabushiki Kaisha, Osaka, Japan

[21] Appl. No.: 08/877,517

[22] Filed: Jun. 17, 1997

[30] Foreign Application Priority Data

Jun. 17, 1996 [JP] Japan ................................. 8-155101

[51] Int. Cl.⁶ .................................................. H04N 1/32
[52] U.S. Cl. ........................................ 358/407; 358/440
[58] Field of Search ........................ 358/434, 402–404, 358/440, 407, 436; 379/100.14; H04N 1/32, 1/00

[56] References Cited

U.S. PATENT DOCUMENTS

| | | | |
|---|---|---|---|
| 5,057,941 | 10/1991 | Moriya .................................... | 358/440 |
| 5,175,634 | 12/1992 | Matsuzaki ............................... | 358/407 |
| 5,196,843 | 3/1993 | Yoshino ................................. | 340/825.52 |
| 5,594,867 | 1/1997 | Yoshida ................................. | 395/200.15 |

FOREIGN PATENT DOCUMENTS 5-14571 1/1993 Japan .

Primary Examiner—Kim Yen Vu

[57] ABSTRACT

A facsimile device of the present invention includes: a memory for storing a source facsimile number corresponding to an information source which has a piece of or a plurality of pieces of information, a plurality of broadcast facsimile numbers corresponding to a plurality of broadcast receivers, and a procedure by which information is extracted from the plurality of pieces of information of the information source; a dialer dialing the source facsimile number corresponding to the information source so as to communicate with the information source; and a controller extracting the information from the plurality of pieces of information of the information source based on the procedure for extracting the information and allowing the information to be stored in the memory, wherein the dialer dials a broadcast facsimile number corresponding to one of the plurality of broadcast receivers after a lapse of a predetermined time so as to communicate with the one of the plurality of broadcast receivers, and the controller transmits the information stored in the memory to the one of the plurality of broadcast receivers.

9 Claims, 3 Drawing Sheets

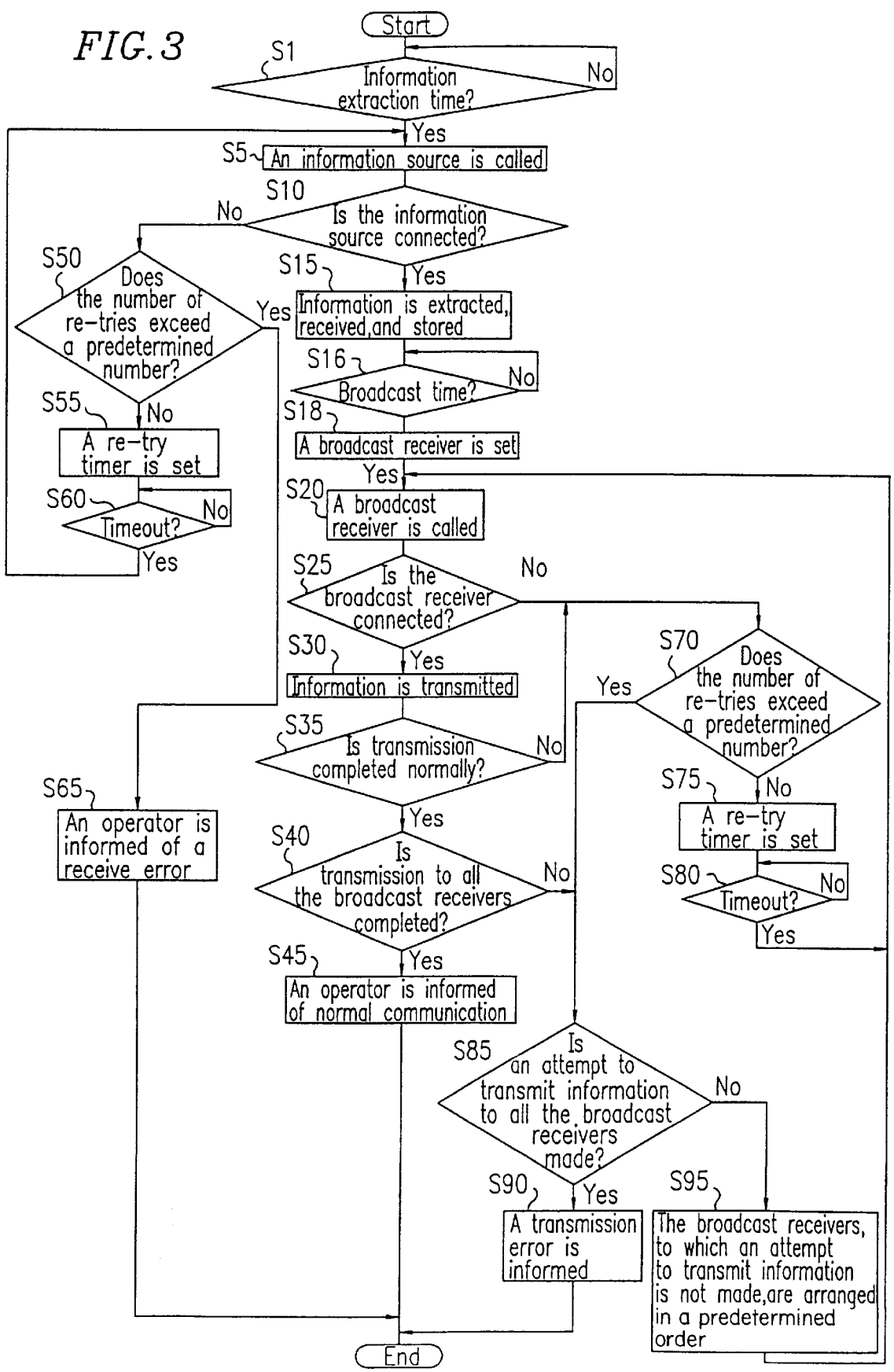

FACSIMILE DEVICE AND METHOD FOR TRANSMITTING INFORMATION USING THE SAME

BACKGROUND OF THE INVENTION

1. Field of the Invention

The present invention relates to a facsimile device which receives and transmits information and a method for receiving and transmitting information using the facsimile device.

2. Description of the Related Art

Japanese Laid-Open Patent Publication No. 5-14571 discloses a communication method using an ISDN line. More specifically, when a request station on a sending side transmits relay command information and an original image to a relay center, the relay center transmits the original image by relay to a receiving station specified by the relay command information.

SUMMARY OF THE INVENTION

A facsimile device of the present invention includes: a memory for storing a source facsimile number corresponding to an information source which has a piece of or a plurality of pieces of information, a plurality of broadcast facsimile numbers corresponding to a plurality of broadcast receivers, and a procedure by which information is extracted from the plurality of pieces of information of the information source; a dialer dialing the source facsimile number corresponding to the information source so as to communicate with the information source; and a controller extracting the information from the plurality of pieces of information of the information source based on the procedure for extracting the information and allowing the information to be stored in the memory. In this facsimile device, the dialer dials a broadcast facsimile number corresponding to one of the plurality of broadcast receivers after a lapse of a predetermined time so as to communicate with the one of the plurality of broadcast receivers, and the controller transmits the information stored in the memory to the one of the plurality of broadcast receivers.

In one embodiment of the present invention, the dialer dials a broadcast facsimile number corresponding to another one of the plurality of broadcast receivers after a lapse of a predetermined time from a time when the controller transmits the information stored in the memory to the one of the plurality of broadcast receivers so as to communicate with the other one of the plurality of broadcast receivers, and the controller transmits the information stored in the memory to the other one of the plurality of broadcast receivers.

According to another aspect of the present invention, a method for transferring information includes: a first dialing step of dialing a source facsimile number corresponding to an information source which has a plurality of information so as to communicate with the information source; an information extracting step of extracting information from the plurality of information based on a procedure for extracting the information from the plurality of information; a first storing step of storing the extracted information; a second dialing step of dialing a broadcast facsimile number corresponding to at least one broadcast receiver so as to communicate with the at least one broadcast receiver; and a transmission step of transmitting the information to the at least one broadcast receiver;

In one embodiment of the present invention, in a case where there are a plurality of predetermined broadcast receivers, the second dialing step includes the step of selecting one broadcast facsimile number from a plurality of broadcast facsimile numbers corresponding to the plurality of broadcast receivers in a predetermined order.

In another embodiment of the present invention, the above-mentioned method further includes a second storing step of storing a first starting time at which the source facsimile number is dialed; and a third storing step of storing a second starting time at which the broadcast facsimile number corresponding to the at least one broadcast receiver is dialed, wherein the first dialing step is performed at the first starting time, and the second dialing step is performed at the second starting time.

In another embodiment of the present invention, the second dialing step is performed after a lapse of a predetermined time from a time when the first storing step is completed.

Thus, the invention described herein makes possible the advantages of (1) providing a facsimile device which allows an operator to receive information from an information source and transmit the received information to a broadcast receiver in a simplified manner; (2) providing a method for transferring information using the facsimile device; (3) providing a facsimile device which eliminates inconveniences caused when it is desired to receive information from an information source at a predetermined time or it is desired to transmit the received information to a broadcast receiver at a predetermined time; and (4) providing a method for transferring information using the facsimile device.

These and other advantages of the present invention will become apparent to those skilled in the art upon reading and understanding the following detailed description with reference to the accompanying figures.

BRIEF DESCRIPTION OF THE DRAWINGS

FIG. 3 shows another example of a procedure by which a main control portion of the facsimile device shown in FIG. 1 controls a facsimile device to be operated.

DESCRIPTION OF THE PREFERRED EMBODIMENTS

Hereinafter, the present invention will be described by way of illustrative embodiments with reference to the drawings.

Figure 1:
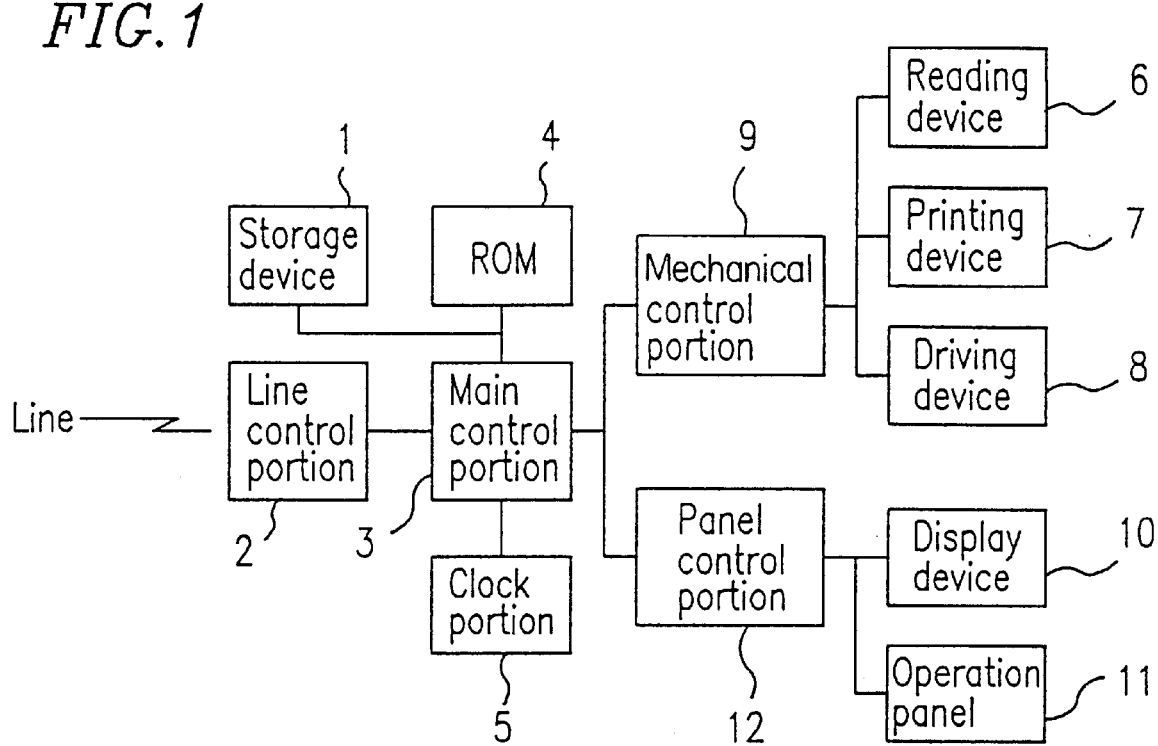
FIG. 1 shows a configuration of a facsimile device of an embodiment according to the present invention.

FIG. 1 shows a configuration of a facsimile device of an embodiment according to the present invention. The facsimile device shown in FIG. 1 includes a storage device 1, a line control portion 2, a main control portion 3, a ROM 4, a clock portion 5, a reading device 6, a printing device 7, a driving device 8, a mechanical control portion 9, a display device 10, an operation panel 11, and a panel control portion 12.

The storage device 1 stores source facsimile numbers corresponding to a plurality of information sources, procedures for extracting information from each of a plurality of the information sources, and broadcast facsimile numbers corresponding to a plurality of broadcast receivers. Here, the broadcast receivers refer to a plurality of receiving sides to which the identical information is transmitted. The storage device 1 stores information extracted from each of a plurality of the information sources.

The content to be stored in the storage device 1 can be increased, modified, or deleted by operator's operating the operation panel 11. The content to be stored in the storage device 1 can be printed by the printing device 7.

The line control portion 2 captures lines when information is transmitted or received.

The main control portion 3 calls a program stored in the ROM 4, for controlling a facsimile device described later, and carries it out.

The clock portion 5 gives the current time to the main control portion 3 and functions as a timer.

The reading device 6 reads information (information shown on paper or the like, e.g., an original).

The printing device 7 prints received information on a recording sheet.

The driving device 8 has a rotating roller for sending a recording sheet or the like containing information to be read.

The mechanical control portion 9 controls the reading device 6, the printing device 7, and the driving device 8 in accordance with an instruction from the main control portion 3, and informs the main control portion 3 of the operation conditions of the reading device 6, the printing device 7, and the driving device 8.

The display device 10 is composed of an LCD or the like.

The operation panel 11 is used for an operator to enter facsimile numbers and the like in the storage device 1. The operation panel 11 may have input keys, a touch panel, etc.

The panel control portion 12 controls the display device 10 and the operation panel 11 in accordance with an instruction from the main control portion 3, and informs the main control portion 3 of the operation conditions of the display device 10 and the operation panel 11.

Hereinafter, an example of a procedure by which the main control portion 3 of the facsimile device shown in FIG. 1 controls a facsimile device to be operated will be described with reference to FIG. 2.

When an operator performs a predetermined operation using the operation panel 11, the main control portion 3 in Step S5 dials a source facsimile number of an information source specified by a predetermined input from outside, among the source facsimile numbers corresponding to a plurality of information sources stored in the storage device 1 and calls the information source.

In Step S10, connection to the information source called by the main control portion 3 is monitored for a predetermined period of time. In the case where connection to the information source is not made, the process proceeds to Step S50. In the case where connection to the information source is made, the process proceeds to Step S15.

In Step S50, the main control portion 3 determines whether the number of re-tries (i.e., re-calls) exceeds a predetermined number. In the case where the number of re-tries exceeds a predetermined number, the process proceeds to Step S65. In the case where the number of re-tries does not exceed a predetermined number, the process proceeds to Step S55.

In Step S55, the main control portion 3 starts a re-try timer.

In Step S60, when the re-try timer counts for a predetermined period of time (e.g., 3 minutes), the process proceeds to Step S5. Thus, re-calls are made repeatedly.

In Step S65, the main control portion 3 allows the printing device 7 to print a predetermined character string and output it to a recording sheet or allows the display device 10 to display it, thereby indicating that the number of re-tries exceeds a predetermined number. Thus, the operator is informed of a receive error.

In Step S15, the main control portion 3 performs a procedure for extracting information from an information source specified by a predetermined input from outside. The facsimile device of the present embodiment receives information from the information source and stores the received information in the storage device 1.

In Step S18, the facsimile device sets a broadcast facsimile number corresponding to a broadcast receiver specified by a predetermined input from outside among the facsimile numbers corresponding to a plurality of broadcast receivers stored in the storage device 1. In the case where a plurality of broadcast receivers are specified, the facsimile device of the present embodiment selects the broadcast facsimile numbers corresponding to the broadcast receivers in a predetermined order.

In Step S20, the facsimile device dials the set broadcast facsimile number or selected broadcast facsimile number.

In the case where Step S20 is performed after Step S15, Step S20 is performed after a lapse of a predetermined time from the completion of Step S15. In the case where Step S20 is performed after Step S95 described later, Step S20 is performed after a lapse of a predetermined time from the completion of Step S40, S85, or S95.

In Step S25, the main control portion 3 monitors the connection with the broadcast receivers for a predetermined period of time. In the case where the broadcast receivers are not connected, the process proceeds to Step S70. In the case where the broadcast receivers are connected, the process proceeds to Step S30.

In Step S70, the main control portion 3 determines whether the number of re-tries exceeds a predetermined number. In the case where the number of re-tries exceeds a predetermined number, the process proceeds to Step S85. In the case where the number of re-tries does not exceed a predetermined number, the process proceeds to Step S75.

In Step S75, the main control portion 3 starts a re-try timer.

In Step S80, when the re-try timer counts for a predetermined period of time (e.g., 3 minutes), the process proceeds to Step S20. Thus, re-calls are made repeatedly.

In Step S85, the main control portion 3 checks whether or not it has made an attempt to transmit information to all the broadcast receivers specified by a predetermined input from outside. The main control portion 3 may check whether or not it has called all the broadcast receivers. In the case where the main control portion 3 has made an attempt to transmit information to all the broadcast receivers, the process proceeds to Step S90. In the case where the main control portion 3 has not made an attempt to transmit information to all the broadcast receivers, the process proceeds to Step S95.

In Step S90, the main control portion 3 allows the printing device 7 to print a predetermined character string and output it to a recording sheet or allows the display device 10 to display it. Thus, the operator is informed of a transmission error. It is more effective that the facsimile device of the present embodiment is adapted to inform the operator of the broadcast receiver which has not received information, as well as the transmission error.

In Step S95, the main control portion 3 selects the subsequent broadcast receiver. The subsequent broadcast receiver is selected from the broadcast receivers which have not been set or selected. For example, the selection of the subsequent broadcast receiver is determined based on the predetermined order. Thereafter, the process proceeds to Step S20, and the subsequent broadcast address is called.

In Step S30, the facsimile device of the present embodiment transmits information stored in the storage device 1. At this time, the intended broadcast receivers are connected and communicable.

In Step S35, the main control portion 3 monitors whether or not the transmission has been completed normally. In the case where the transmission has been completed normally, the process proceeds to Step S40. In the case where the transmission has not been completed normally, the process proceeds to Step S70.

In Step S40, the main control portion 3 checks whether or not the transmission to all the broadcast receivers specified by a predetermined input from outside have been completed. In the case where the transmission has been completed, the process proceeds to Step S45. In the case where the transmission has not been completed, the process proceeds to Step S85.

In Step S45, the main control portion 3 allows the printing device 7 to print a predetermined character string and output it to a recording sheet or allows the display device 10 to display it. The main control portion 3 informs the operator that the communication has been conducted normally.

As described above, a predetermined input from outside allows information to be extracted (received) from an information source and to be transmitted to a broadcast receiver consistently. Therefore, the operator should operate the operation panel of the facsimile device only once.

Because of this, the operator is not required to stand by near the facsimile device until the transmission is completed.

When information is transmitted to a broadcast receiver, the information stored in the storage device 1 is read. Therefore, the operator is not required to set recording sheets (originals) on which information is printed.

Furthermore, the information extraction time and the broadcast time may be stored in the storage device 1 in such a manner that the main control portion 3 is allowed to operate based on a flow chart shown in FIG. 3 in response to the operator's predetermined input through the keys provided on the operation panel 11.

Figure 2:
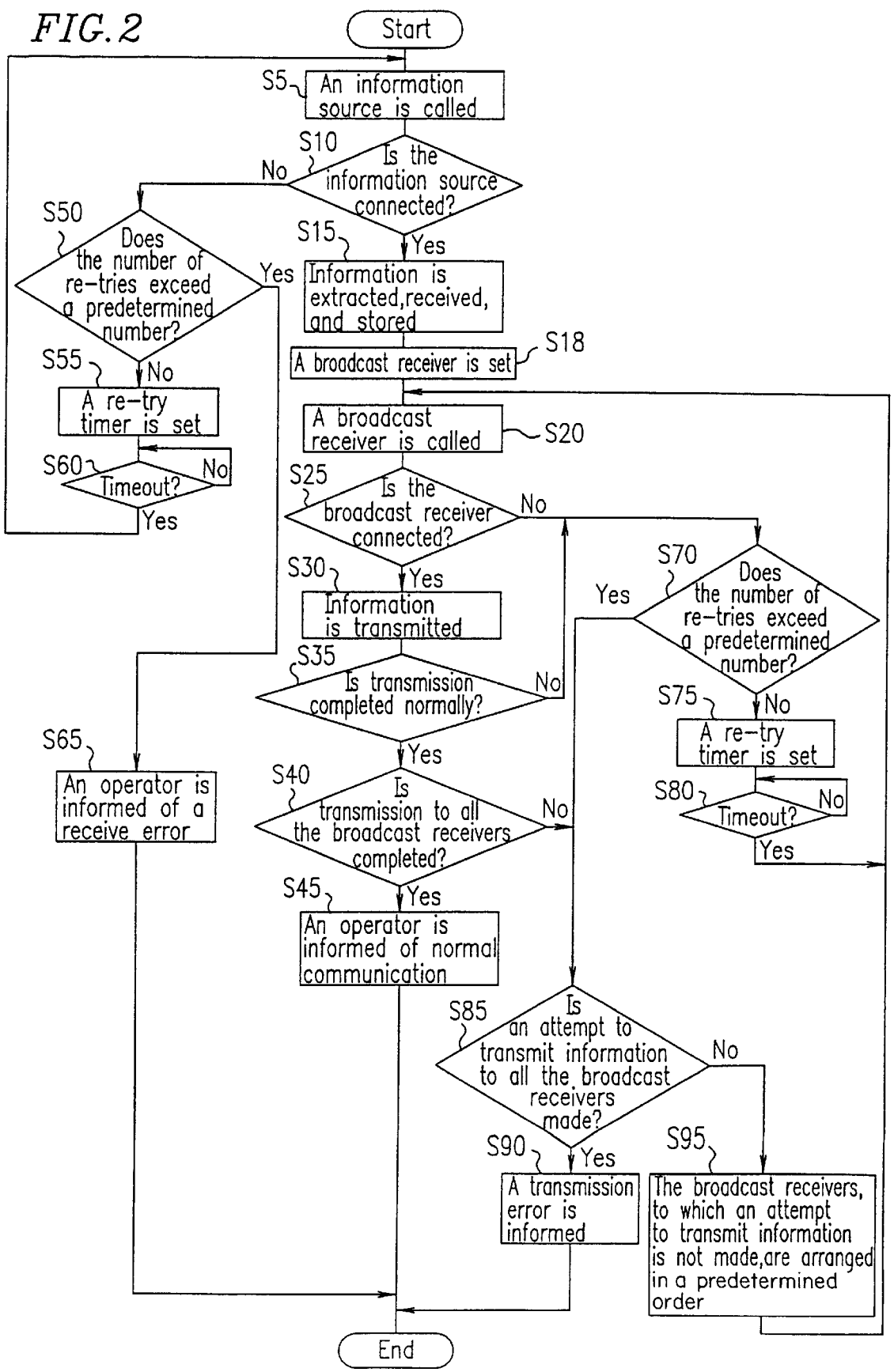
FIG. 2 shows an example of a procedure by which a main control portion of the facsimile device shown in FIG. 1 controls a facsimile device to be operated.

The flow chart shown in FIG. 3 is the same as that shown in FIG. 2, except that Step S1 is added before Step S5, and Step S16 is added between Step S15 and Step S18.

In Step S1, the facsimile device of the present embodiment calls an information source at an information extraction time stored in the storage device 1. In Step S16, the facsimile device of the present embodiment calls broadcast receivers at a broadcast time stored in the storage device 1.

Thus, in the case where it is desired to receive information from an information source at a predetermined time, or in the case where it is desired to transmit the received information to broadcast receivers at a predetermined time, the operator merely conducts an operation, at any time, for receiving information from the information source at a predetermined time or an operation for transmitting the received information to the broadcast receivers at a predetermined time. Since it is not required for the operator to operate at a predetermined time, the operator is not forced to attend to operation, which is very convenient.

In the above-mentioned embodiment, in the case where connection cannot be made with a broadcast receiver being called or in the case where the transmission of information is not completed normally irrespective of normal connection, an attempt is made to transmit information by calling the broadcast receiver repeatedly as long as a standard is satisfied (i.e., the number of retries does not exceed a predetermined number). Alternatively, regarding a broadcast receiver which is called once but whose connection cannot be made or a broadcast receiver whose connection is made but which cannot receive information normally, calls may be made later without re-tries. More specifically, the subsequent broadcast receivers may be called in a predetermined order.

In the above-mentioned case, inconveniences such as the endless repetition of calls are not caused due to the abnormality of lines and that of equipment of broadcast receivers, for example, by controlling the total number of calls.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A facsimile device comprising:

a memory for storing a source facsimile number corresponding to an information source which has a piece of information or a plurality of pieces of information, a plurality of broadcast facsimile numbers corresponding to a plurality of broadcast receivers, a procedure by which information is extracted from the plurality of pieces of information of the information source, a first start time at which the source facsimile number is to be dialed and a second start time at which at least one broadcast facsimile number is to be dialed;

a dialer dialing the source facsimile number corresponding to the information source so as to communicate with the information source; and a controller extracting the information from the plurality of pieces of information of the information source based on the procedure for extracting the information and allowing the information to be stored in said memory, said dialer dialing the broadcast facsimile number corresponding to one of the plurality of broadcast receivers after a lapse of a predetermined time so as to communicate with the one of the plurality of broadcast receivers, said controller transmitting the information stored in said memory to the one of the plurality of broadcast receivers.

2. The facsimile device according to claim 1, wherein said dialer dials a broadcast facsimile number corresponding to another one of the plurality of broadcast receivers after a lapse of a predetermined time from a time when said controller transmits the information stored in said memory to the one of the plurality of broadcast receivers so as to communicate with another one of the plurality of broadcast receivers, said controller transmitting the information stored in said memory to the another one of the plurality of broadcast receivers.

3. The facsimile device according to claim 1, wherein said dialer dials broadcast facsimile numbers of a plurality of selected broadcast receivers, transmission of the information stored in said memory is completed or at least attempted to all of the plurality of selected broadcast receivers.

4. The facsimile device according to claim 1, wherein said dialer dials the source facsimile number at the first start time and dials the at least one broadcast facsimile number at the second start time.

5. A method of automated information transfer comprising:
   a) storing a first starting time at which a source facsimile number is to be dialed and a second starting time at which a broadcast facsimile number is to be dialed;
   b) dialing the source facsimile number corresponding to an information source which has a plurality of information so as to communicate with the information source;
   c) extracting information from the plurality of information based on a procedure for extracting the information from the plurality of the information;
   d) storing the extracted information;
   e) dialing the broadcast facsimile number corresponding to at least one broadcast receiver so as to communicate with the at least one broadcast receiver; and
   f) transmitting the information to the at least one broadcast receiver.

6. The method of automated information transfer according to claim 3, wherein said step e) is performed after a lapse of a predetermined time from completion of said step d).

7. The method of automated information transfer according to claim 5, wherein if there are a plurality of predetermined broadcast receivers, said step e) includes selecting one broadcast facsimile number from a plurality of broadcast facsimile numbers corresponding to the plurality of predetermined broadcast receivers in a predetermined order.

8. The method of automated information transfer according to claim 5, wherein said step b) comprises dialing the source facsimile number at the first starting time and said step e) comprises dialing the broadcast facsimile number at the second starting time.

9. The method of automated information transfer according to claim 5, wherein said step e) comprises dialing broadcast facsimile numbers of a plurality of selected broadcast receivers, said step f) comprises completing or at least attempting transmission of the information to all of the plurality of selected broadcast receivers.

* * * * *